United States Patent [19]

Ehara et al.

[11] Patent Number: 4,687,832

[45] Date of Patent: Aug. 18, 1987

[54] NOVEL EPOXY RESIN COMPOSITIONS

[75] Inventors: Shunji Ehara; Shuji Nakamura; Masato Akama, all of Ichihara, Japan

[73] Assignee: Dainippon Ink and Chemicals, Inc., Tokyo, Japan

[21] Appl. No.: 814,922

[22] Filed: Dec. 30, 1985

[51] Int. Cl.$^4$ ............................................. C08G 59/24
[52] U.S. Cl. ...................................................... 528/97
[58] Field of Search ......................................... 528/97

[56] References Cited

U.S. PATENT DOCUMENTS 2,938,875  5/1960  Martin et al. ........................ 528/365
3,635,843  1/1972  Parry et al. ........................... 528/97
4,396,649  8/1983  Bailey et al. ...................... 528/114 X Primary Examiner—Earl Nielsen
Attorney, Agent, or Firm—Sherman and Shalloway

[57] ABSTRACT

An epoxy resin composition comprising an epoxy resin and a curing agent for said resin and optionally a curing accelerator, the improvement of which the epoxy resin is an epoxy resin obtained by reacting dihydroxynaphthalene of formula

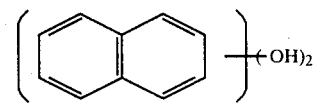

with epichlorohydrin.

6 Claims, No Drawings

NOVEL EPOXY RESIN COMPOSITIONS

This invention relates to a novel useful epoxy resin composition. More specifically, this invention relates to a resin composition comprising an epoxy resin being a condensation reaction product of various dihydroxynaphthalenes with epichlorohydrin, a curing agent for said epoxy resin and optionally a curing accelerator, which composition is excellent in heat resistance, water resistance and mechanical properties as well as rich in toughness by improving brittleness and is suited for a wide range of applications such as casting, bonding, laminating, molding and coating.

Epoxy resins generally provide cured products excellent in mechanical properties, water resistance, chemical resistance, heat resistance and electrical properties by curing them with varied curing agents. Said resins therefore find widespread uses in bonding agents, coatings, laminates, molding materials and casting materials.

The general-purpose epoxy resins are liquid or solid bisphenol A-type epoxy resins obtained by reacting 2,2-bis-(4-hydroxyphenyl) propane (also called bisphenol A) with epichlorohydrin. As they have however less than two glycidyl groups per molecule, a crosslinking density is low at the time of curing and a heat resistance is therefore poor.

In order to remedy such defect, novolac-type epoxy resins, so-called polyfunctional epoxy resins are used. These polyfunctional epoxy resins, to be sure, improve the heat resistance, but cured products obtained from said resins become undesirously brittle.

Accordingly, an object of this invention is to remedy the various problems found in the conventional techniques, i.e. to provide a novel epoxy resin composition having superior heat resistance, toughness and excellent mechanical properties.

The present inventors have made extensive studies to achieve the above object, and as a result discovered that a resin composition obtained by blending a specific epoxy resin resulting from the reaction between dihydroxynapthalene of formula

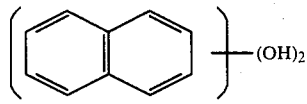

and epichlorohydrin with a curing agent and optionally a curing accelerator possesses the above-described properties to meet the object of this invention.

Thus, this invention is to provide a resin composition comprising an epoxy resin and a curing agent for said resin and optionally a curing accelerator, characterized in that the epoxy resin is an epoxy resin obtained by reacting dihydroxynaphthalene of formula [I] with epichlorohydrin.

Typical examples of the dihydroxynaphthalene are as follows.

1,4-Dihydroxynaphthalene of formula

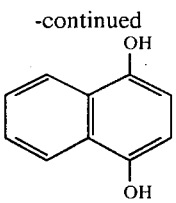

1,5-Dihydroxynaphthalene of formula

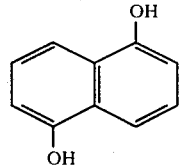

1,6-Dihydroxynaphthalene of formula

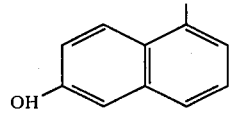

1,8-Dihydroxynaphthalene of formula

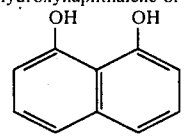

2,6-Dihydroxynaphthalene of formula

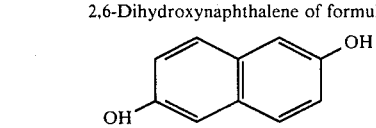

The epoxy resins used in this invention are obtained by reacting such dihydroxynaphthalenes with epichlorohydrin in the presence of an alkali. At this time, the reaction conditions may be the same as ordinary conditions of producing epoxy resins, and are not limited in particular. For instance, an epoxidation reaction can be performed by heating these dihydroxynaphthalenes and epichlorohydrin in the presence of an alkali such as sodium hydroxide at a temperature of 20° to 120° C. such that epichlorohydrin is used in an amount of 0.7 to 10 mols per hydroxyl group of these dihydroxynaphthalenes. In that instance, a molecular weight, an epoxy equivalent and a softening point of final epoxidized products (epoxy resins) can be properly adjusted by adjusting the excess ratio of epichlorohydrin relative to the hydroxyl group. When the excess ratio of epichlorohydrin decreases, the molecular weight of epoxy resins increases to give cured products having a high toughness. On the other hand, when the excess ratio increases, the molecular weight lowers to give cured products having a high heat resistance. Generally speaking, however, if the excess ratio is more than four times, properties do not change so much. It is therefore advisable that the excess ratio is five times or less.

Although the epoxy resins are bifunctional, the cured products of said resins are excellent in heat resistance and mechanical properties and not brittle but rich in toughness presumably because the naphthalene skeleton per se is stable and cohesion acts between naphthalene skeletons.

As the curing agents, any compounds commonly used as curing agents for epoxy resins will do. Typical examples thereof include aliphatic amines such as diethylenetriamine and triethylenetetramine; aromatic amines such as metaphenylenediamine, diaminodiphenylmethane and diaminodiphenylsulfone; various polyamide resins or modified substances thereof; acid anhydrides such as maleic anhydride, phthalic anhydride, tetrahydrophthalic anhydride, hexahydrophthalic anhydride and pyromellitic anhydride; and latent curing agents such as dicyandiamide, imidazole, BF$_3$-amine complexes and guanidine derivatives.

When using the above compounds as curing agents, it is necessary in most cases to conjointly use curing accelerators too. On that occassion, known curing accelerators including tertiary amines such as dimethylbenzylamine, imidazoles and varied metal compounds are available.

The compositions of this invention can contain, if required, customary additives such as fillers, coloring agents, etc., and conjointly use tars, pitches, amino resins and phenolic resins.

The thus obtained epoxy resin compositions of this invention provide cured products having excellent heat resistance, water resistance and mechanical properties as well as toughness without brittleness.

Accordingly, the compositions of this invention are very useful in a wide variety of applications such as molding materials, casting materials, laminating materials, coatings and bonding agents.

The following Referential Examples, Examples and Comparative Examples illustrate this invention more specifically. All parts are on the weight basis unless otherwise specified.

REFERENTIAL EXAMPLE 1

(Example Of Preparing An Epoxy Resin Derived From Dihydroxynaphthalene)

With stirring, 440 g (2.2 mols) of a 20% NaOH aqueous solution was added dropwise to a solution of 160 g (1 mol) of 1,6-dihydroxynaphthalene in 740 g (8 mols) of epichlorohydrin at 80° C., over the course of 5 hours, followed by reacting the mixed solution for another 1 hour. After an aqueous layer was discarded, excess epichlorohydrin was recovered by distillation. 408 g of toluene was added to the resulting reaction product to uniformly dissolve it. After the resulting substance was washed with 130 g of water, an oil layer was separated from an aqueous layer and water was removed from the oil layer by azeotropic distillation. The residue was then filtered and toluene was distilled off to obtain 258 g of a semi-solid epoxy resin having an epoxy equivalent of 154.

REFERENTIAL EXAMPLE 2

(-ditto-)

The procedure in Referential Example 1 was followed except changing the amount of epichlorohydrin to 324 g (3.5 mols). There resulted 249 g of an epoxy resin (b) having an epoxy equivalent of 178 and a softening point of 59° C.

REFERENTIAL EXAMPLE 3

(-ditto-)

With stirring, 440 g (2.2 mols) of a 20% NaOH aqueous solution was added dropwise to a solution of 160 g (1 mol) of 1,5-dihydroxynaphthalene in 740 g (8 mols) of epichlorohydrin at 80° C. over the course of 5 hours, followed by reacting the mixed solution for another 1 hour. A crystalline reaction product precipitated and was separated by filtration, washed with water and methanol, and dried to obtain 220 g of a crystalline epoxy resin (c) having an epoxy equivalent of 141 and a melting point of 165° C.

REFERENTIAL EXAMPLE 4

(-ditto-)

With stirring, 440 g (2.2 mols) of a 20% NaOH aqueous solution was added dropwise to a solution of 160 g (1 mol) of 1,5-dihydroxynaphthalene in 231 g (2.5 mols) of epichlorohydrin and 54 g of toluene at 80° C. over the course of 5 hours, followed by reacting the mixed solution for another 1 hour. 354 g of toluene was added to dissolve the reaction product. An oil layer was separated from an aqueous layer, and water was removed from the oil layer by azeotropic distillation. The residue was filtered and toluene was further distilled off to afford 245 g of an epoxy resin (d) having an epoxy equivalent of 189 and a softening point of 65° C.

REFERENTIAL EXAMPLE 5

(-ditto-)

The procedure in Referential Example 3 was repeated except using 1,4-dihydroxynaphthalene instead of 1,5-dihydroxynaphthalene. There resulted 221 g of a crystalline epoxy resin (e) having an epoxy equivalent of 142 and a melting point of 110° C.

REFERENTIAL EXAMPLE 6

(-ditto-)

The procedure in Referential Example 4 was repeated except using 1,4-dihydroxynaphthalene instead of 1,5-dihydroxynaphthalene. There was obtained 243 g of an epoxy resin (f) having an epoxy equivalent of 190 and a softening point of 63° C.

EXAMPLES 1-6 AND COMPARATIVE EXAMPLES 1-2

Epoxy resin compositions of this invention and those for comparison were produced using the epoxy resins (a)-(f) obtained in Referential Examples 1-6, a bisphenol A-type liquid epoxy resin Epiclon 840 (a tradename for a product made by Dainippon Ink & Chemicals, Inc.; epoxy equivalent 185) and a phenolic novolac-type epoxy resin Epiclon N-738 (a tradename for a product made by Dainippon Ink & Chemicals, Inc.; epoxy equivalent 175, semi-solid type) as epoxy resins, Epiclon B-570 (a tradename for a product made by Dainippon Ink & Chemicals, Inc.; methyltetrahydrophthalic anhydride) as a curing agent, and 2-ethyl-4-methylimidazole as a curing accelerator in the formulations shown in Table 1 such that an acid anhydride group of the curing agent is 1 per epoxy group of the epoxy resin.

Test samples were prepared by curing these epoxy resin compositions at 100° C. for 2 hours, at 160° C. for 2 hours and further at 180° C. for 2 hours. A heat distortion temperature, a flexural strength, a tensile strength and a tensile elongation were then measured according to JIS K-6911.

Test samples, 25 mm×75 mm×3 mm, were dipped in a boiling water for 2 hours, and percent of increase in weight thereof after said dipping was measured. Its value was made a boiling water absorption.

The results are shown in Table 1.

TABLE 1

| Items | Examples | | | | | | Comparative Examples | |
|---|---|---|---|---|---|---|---|---|
| | 1 | 2 | 3 | 4 | 5 | 6 | 1 | 2 |
| Epoxy resin (a) (parts) | 100 | | | | | | | |
| Epoxy resin (b) (parts) | | 100 | | | | | | |
| Epoxy resin (c) (parts) | | | 100 | | | | | |
| Epoxy resin (d) (parts) | | | | 100 | | | | |
| Epoxy resin (e) (parts) | | | | | 100 | | | |
| Epoxy resin (f) (parts) | | | | | | 100 | | |
| Epiclon 840 (parts) | | | | | | | 100 | |
| Epiclon N-738 (parts) | | | | | | | | 100 |
| Curing agent Epiclon B-570 (parts) | 108 | 93 | 118 | 88 | 117 | 87 | 90 | 95 |
| 2-Ethyl-4-methylimidazole (parts) | 1 | 1 | 1 | 1 | 1 | 1 | 1 | 1 |
| Heat distortion temperature (°C.) | 158 | 151 | 160 | 153 | 153 | 149 | 121 | 152 |
| Flexural strength (kg/mm$^2$) | 15 | 14 | 14 | 13 | 14 | 13 | 13 | 12 |
| Tensile strength (kg/mm$^2$) | 9 | 8 | 8 | 7 | 8 | 7 | 8 | 6 |
| Tensile elongation (%) | 3.9 | 4.5 | 4.0 | 4.7 | 3.8 | 4.3 | 4.5 | 1.5 |
| Boiling water absorption (%) | 0.15 | 0.16 | 0.14 | 0.15 | 0.14 | 0.16 | 0.19 | 0.17 |

What we claim is:

1. An epoxy resin composition comprising an epoxy resin and a curing agent for said resin and optionally a curing accelerator, the improvement of which the epoxy resin is an epoxy resin obtained by reacting dihydroxynaphthalene of formula

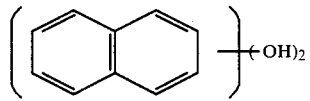

with epichlorohydrin.

2. The epoxy resin composition of claim 1 wherein the epoxy resin is obtained by reacting 1,4-dihydroxynaphthalene with epichlorohydrin.

3. The epoxy resin composition of claim 1 wherein the epoxy resin is obtained by reacting 1,5-dihydroxynaphthalene with epichlorohydrin.

4. The epoxy resin composition of claim 1 wherein the epoxy resin is obtained by reacting 1,6-dihydroxynaphthalene with epichlorohydrin.

5. The epoxy resin composition of claim 1 wherein the epoxy resin is obtained by reacting 1,8-dihydroxynaphthalene with epichlorohydrin.

6. The epoxy resin composition of claim 1 wherein the epoxy resin is obtained by reacting 2,6-dihydroxynaphthalene with epichlorohydrin.

* * * * *